Oct. 8, 1957 J. F. HERRMANN 2,808,759
SLIDE PROJECTORS
Filed Oct. 12, 1953 2 Sheets-Sheet 1
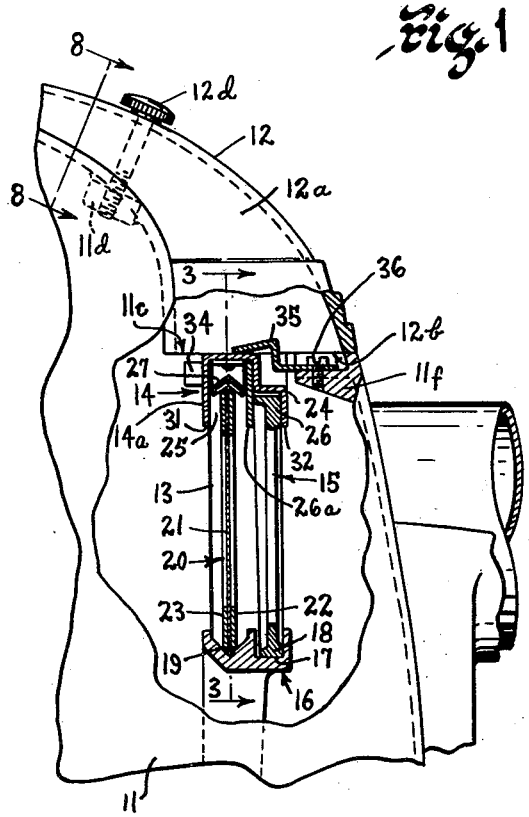
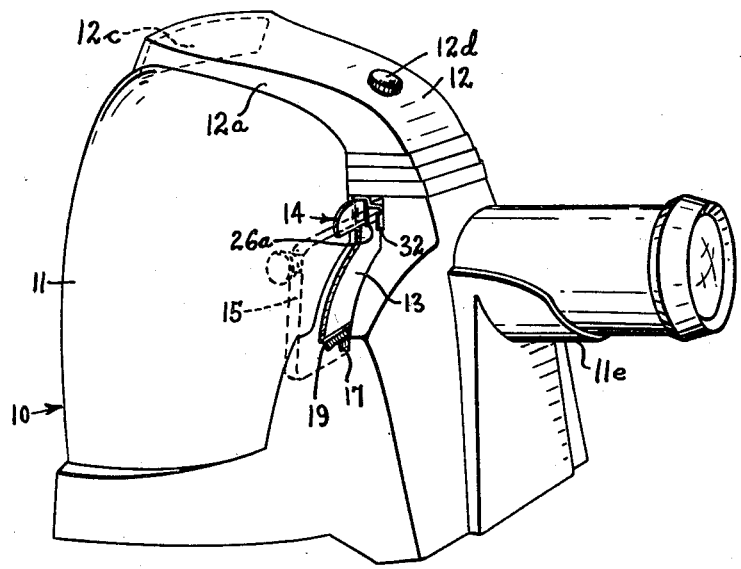
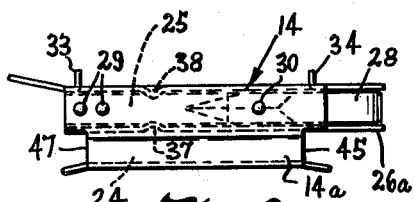
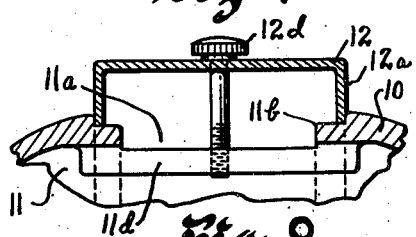
INVENTOR
JOHN F. HERRMANN
BY Louis L. Gagnon
Noble J. Williams
ATTORNEYS Oct. 8, 1957  J. F. HERRMANN  2,808,759
SLIDE PROJECTORS
Filed Oct. 12, 1953  2 Sheets-Sheet 2
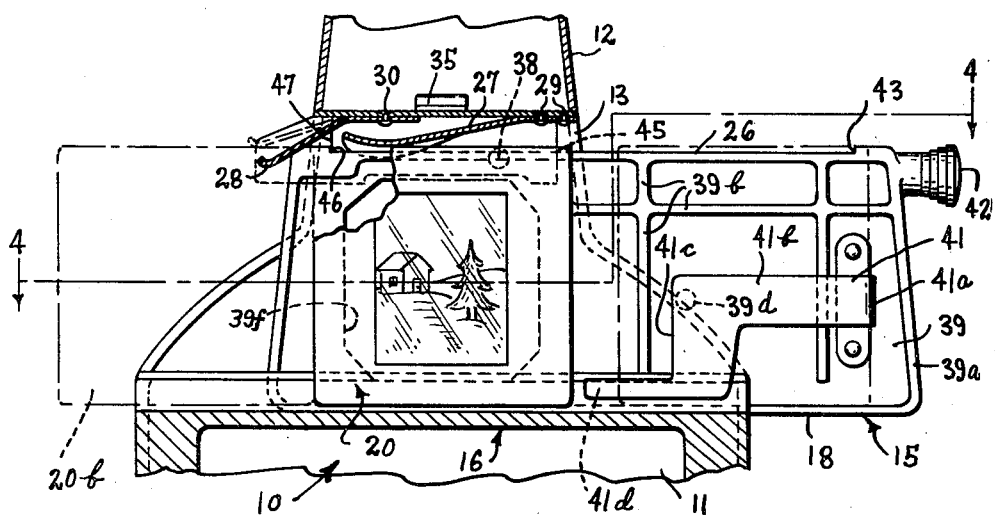
INVENTOR
JOHN F. HERRMANN
BY Louis L. Gagnon
Noble S. Williams
ATTORNEYS United States Patent Office 2,808,759
Patented Oct. 8, 1957

2,808,759

SLIDE PROJECTORS

John F. Herrmann, Lynnfield, Mass., assignor to American Optical Company, Southbridge, Mass., a voluntary association of Massachusetts Application October 12, 1953, Serial No. 385,585

9 Claims. (Cl. 88—28)

This invention relates to projection apparatus and particularly to a projector housing, slide pusher and supporting means therefor for properly positioning transparent lantern slides or the like at a predetermined projection aperture in the apparatus for projection purposes and for the ejection of slides from said housing after same have been displayed.

One of the principal objects of the present invention is to provide a new and improved projector housing construction having a slide pusher or slide changer and supporting means therefor which is of sturdy and economical construction and which is provided with a minimum number of easily formed and readily assembled parts and with the slide pusher and supporting means thereof being so constructed and arranged that they may receive and guide successive individual slides into the projector housing, properly support each successive slide in a projection position therein and guide each slide out of the projector housing after the projection thereof.

It is a further object of the present invention to provide for such projection apparatus a slide pusher or changer and supporting means therefor of the type mentioned above and which is constructed and arranged to receive and support lantern slides or the like of various thicknesses in a centered position in said projection aperture relative to a predetermined focal plane of the projector objective for projection purposes.

It is an object of the present invention to provide slide supporting means and a slide pusher or changer for said projection apparatus for moving individual slides into said centered projection position including readily operable means on said pusher or changer for ejecting or moving the last slide of a group of slides out of the projection position and at least partially out of said housing, whereby same will be readily accessible to the operator of the apparatus for the removal thereof.

It is an object of the invention to provide a projector housing and slide changer therefor of the character described which may be easily formed by a molding or casting technique and having associated parts which may be easily fabricated and assembled therewith to provide a finished instrument with a minimum amount of time and effort being required.

It is a further object of the invention to provide a slide pusher and supporting means therefor of the above character and means associated therewith for yieldably retaining slides which have been displayed in the apparatus in an accessible position moved at least partially out of the projection aperture so as to be readily accessible to the operator of the apparatus.

Other objects and advantages of the present invention will become apparent from the detailed description which follows when taken in conjunction with the accompanying drawings in which:

Fig. 1 is a perspective view of a projector embodying the present invention, the projector having the slide pusher thereof shown in dotted lines;

Fig. 2 is a fragmentary side view of the projector of Fig. 1 and showing parts thereof broken away and other parts in section;

Fig. 3 is a fragmentary sectional view taken substantially on line 3—3 of Fig. 2 and looking in the direction of the arrows;

Fig. 4 is a sectional view taken substantially on line 4—4 of Fig. 3 and looking in the direction of the arrows;

Fig. 5 is a view somewhat similar to Fig. 4 but showing parts thereof moved to a different position;

Figs. 6 and 7 are plan and side elevational views respectively, of an upper guide means constituting a part of the supporting means for the projector slide pusher; and, Fig. 8 is a fragmentary sectional view taken substantially on line 8—8 of Fig. 2 and looking in the direction of the arrows.

Referring to the drawings in detail and particularly to Fig. 1, it will be seen that a projector embodying the present invention is generally indicated by the numeral 10 and comprises a main housing portion 11 and a cover portion 12 removably secured thereon. The main housing portion 11 is preferably formed as a one-piece hollow casting substantially fully open at the bottom thereof and a longitudinal central opening 11a is provided in the top thereof. Flanges 11b are formed on the main housing portion 11 along parts of the opposite sides of the central opening (see Fig. 8) for receiving and supporting the vertical side walls 12a of the cover portion 12. The open bottom allows insertion of a lamp socket, reflector, condenser lenses and the like (not shown) and allows cooling air to enter the projector while the central opening 11a and cover 12 provide convenient access to the interior of the housing for the replacement of the incandescent bulb when necessary.

As clearly shown in Fig. 2, the front downwardly curving end of the cover portion 12 is provided with a horizontal supporting surface 12b which is arranged to fit and rest upon the upwardly facing horizontal surface 11c of the main housing portion 11. Thus the longitudinal opening 11a in the top of the main housing portion will be normally closed by the cover portion 12 except for an exhaust port provided near the top rear of the instrument, as indicated by dotted lines 12c (Fig. 1), and except for a pair of slide receiving openings 13 provided in the side walls of the main housing 11. A brace 11d extends across the opening 11a and is integral with the main housing portion 11 at its opposite ends as shown in Fig. 8. This brace is centrally threaded to receive the end of a thumb screw 12d releasably retaining the cover portion 11 in place.

The main housing portion 11 is also provided with a cross bar 16 (see Figs. 2 and 3) which is integrally attached to the main housing portion at locations adjacent the lower ends of the side wall openings 13. It will be noted that the top of this cross bar 16 and the lower part of the openings 13 are carefully shaped so as to form lower guiding and supporting means for a slide pusher 15 and for individual picture slides 20. The side wall openings 13 are shaped near their upper ends to receive an upper insertable guide means 14 for also supporting and guiding the slide pusher 15. The cross bar 16 and the brace 11d are preferably formed at the time the main housing portion 11 is cast or moulded, as is also the apron 11e to which the cylindrical tube for guiding the objective is subsequently screwed or otherwise secured.

It will be noted that the cross bar 16 is shaped to provide lower guiding and supporting means in the form of two adjacent horizontally extending guideways, one of which is of generally rectangular shape in cross section, as indicated at 17, to receive the lower edge 18 of the slide pusher 15 and the other of which is V-shaped in cross section, as indicated at 19, to receive and automatically center the lower edge of picture or lantern slides of varying thicknesses.

It is a common experience at the present time to have different slides of a group of lantern slides composed of mounting materials of various thicknesses and such slides are generally formed, as shown in Fig. 2, by the picture containing film 21 being generally centrally located between outer layers 22 and 23 of mounting material. It follows, however, whether the mounting material 22 and 23 are thick or thin, that the film 21 of successive pictures being displayed by the projector should each be disposed in a single common transverse plane when at the projection aperture so that refocusing of the objective will not be necessary.

The upper insertable guide means 14 mentioned above is provided with such centering means. The upper guide means is preferably formed of sheet metal, such as an outer guide member 14a having downwardly bent sides and an intermediate vertically disposed spacer member 26a secured thereto centrally between the sides. The upper guide means 14 thus comprises two separate transversely extending channels 24 and 25 in side-by-side relation. One of the channels, 24, is rectangular in cross section so as to receive and guide the upper edge 26 of the pusher 15 and the other of said channels, 25, is rectangular in cross section and arranged to accommodate the upper edge of the successive lantern slides.

The channel 25 is thus arranged to accommodate first and second cantilever leaf spring members 27 and 28 disposed substantially in alignment transversely of the projector, and each of these spring members is riveted or otherwise secured at an end thereof to the outer bent guide member 14a, as indicated at 29 and 30 respectively, so as to slope downwardly in the same direction into the channel. The first spring member 27 has its free end 27b formed to provide an inverted V-shaped guideway directly above the V-shaped guideway in the cross bar 16. Thus together, the upper and lower V-shaped guideways yieldably receive and center the upper and lower edges of each successive lantern slide as it is moved into the projector and into alignment with projection aperture thereof. The second leaf spring 28 and its functions will be more fully hereinafter described.

The upper ends of the side wall openings 13 are provided with small shelves or notches 31 and 32 for engaging and positioning the upper guide means 14 in the openings and in definite spaced relation to the lower channels 17 and 19. Proper horizontal positioning of the upper guide means 14 within the main housing portion 11 is maintained by a pair of tabs 33 and 34 (see Fig. 6) struck outwardly from the side of the bent sheet metal guide member 14a so as to engage the inner surfaces of the side walls of the main housing portion 11. The upper guide means 14 is secured against vertical displacement in the upper ends of the openings 13 by a clamping member 35 which is detachably secured to an inwardly projecting lug 11f integral with the housing portion 11 by means of a bolt 36 or the like.

Referring to Figs. 6 and 7, it will be seen that a pair of protrusions 37 and 38 are pressed into the sheet metal forming the sides of the upper channel 25. These protrusions 37 and 38 are located forwardly of the spring 27 in the channel so as to assist in approximately centering the upper edge of each lantern slide 20 as it is pushed into the projector and approaches the leaf spring 27. Of course, the spacing between these protrusions will be slightly greater than the thickness of the thickest slide normally used with the projector. Thus when a slide 20 contacts a cam surface 27a on the leaf spring 27, the spring will be cammed upwardly slightly and the upper edge of the slide will ride beneath the inverted V-shaped portion 27b and will be accurately centered thereby.

The slide pusher 15, previously referred to, comprises a relatively thin elongated plate-like slide member 39 preferably formed by a moulding or casting process.

Thus it is an easy matter to provide this slidable member with an endless integral stiffening flange 39a around its outer edge and additional stiffening ribs 39b intermediate the edges of the member as clearly shown by Figs. 3 and 4. Attached to the slide member 39 near one end thereof is a resilient pusher member 41 and this member is formed into a U-shape formation adjacent its attachment to the slide member 39 so as to provide a pocket 40 for initially receiving a slide as indicated by the dot-dash outline 20a in Fig. 4. When positioned in the pocket the slide will be substantially vertical and its lower edge will rest in the V-shaped channel 19. The U-shaped pusher member 41 has a bight portion 41a for engaging and pushing the slide into the projector and a long resilient free arm portion 41b for maintaining the slide in its substantially vertical position while in said pocket.

A handle 42 is provided upon the slide member 39 for moving same in either transverse direction. Movement of the handle toward the projector will cause a slide in the pocket 40 to move through the adjacent opening 13 and into the main housing portion 11. To center a lantern slide in its proper position, transversely of the projector, for projection purposes as shown at 20 in Fig. 3 there is provided upon the slide member 39 a projecting shoulder 43 disposed at a predetermined distance from a fixed edge 45 on the bent member 14a forming the channel 24 in the upper guide means 14. When the slide pusher is moved to transfer a slide in the pocket 40 into the projection position the bight portion 41a will push the slide inwardly until the shoulder 43 strikes the edge 45 and prevents further inward travel thereof. At this time the projection light beam will be completely blocked off by the plate-like member 39.

A second fixed stop or shoulder 46 is provided upon the upper edge of the slide pusher and arranged to contact an opposite edge 47 on the bent member 14a to limit travel of the slide pusher in an opposite (outward) direction. Travel of the pusher at such time, of course, will not affect the slide 20 positioned for projection in the instrument. When the member 39 is returned to its outer position shown in Fig. 3 an aperture 39f therein will be aligned with the picture portion of the slide 20 and an image thereof will be projected from the instrument. Obviously, the limiting stop 46 on the slide pusher 14 could be made movable or retractable in known manner to an inoperative position, if desired, and such an arrangement would allow the slide pusher to be removed from the projector when not being used.

During use of the projector each successive slide placed in pocket 40 and pushed into the projector will engage a slide therein and force same outwardly through the opening 13 at the opposite side of the main housing portion 11. The slide being ejected thus will have its upper forward corner ride under the cantilever spring 28, previously mentioned and thus the slide will remain in a position mostly exposed as indicated by dot-dash lines 20b in Fig. 3 so that the operator of the instrument may conveniently remove same.

To remove the last lantern slide from the projector there is provided upon the bent member 41, as shown by Figs. 3, 4 and 5, a downwardly and inwardly sloping extension 41c carrying a forward finger portion 41d. Thus it is possible for the operator to press the outer side of the bent member 41 and force same against a stop 39d on the slide member 39 and this action will cause the forward finger portion 41d to move toward the member 39 sufficiently to travel at the opposite side of the slide 20 at the projection aperture as indicated in Fig. 5 and this presents the sloping forward edge of the portion 41c to the last slide 20c in the projector. This inward travel of the slide pusher with the bent member 41 pinched inwardly will cause the edge of the slide 20c to be engaged by this sloping edge and move the slide to the dotted line position 20b.

It will be noted that the projector main housing portion 11 and cover portion 12 and the upper slide pusher supporting means 14 are so designed as to allow ample space for the fingers of the operator in loading and positioning the slide for projection and for removing the slide from the projector after projection thereof. To assemble the slide pusher 15 and the upper support member 14 in the projector 10, the cover 12 is first removed from the projector by releasing the locking means 12d. The slide pusher assembly may then be inserted into the openings 13 with its lower edge 18 positioned in the rectangular channel 17. The upper supporting member 14 may now be placed in the enlarged upper part of the openings 13 and the retaining means 35 and 36 secured in place as shown in Fig. 2. The cover portion may then be secured in place by means of the bolt 12d.

From the foregoing description it will be seen that simple, efficient and economical means and methods have been provided for accomplishing the objects and advantages of the invention.

I claim:

1. A slide projector comprising a hollow one-piece moulded main housing portion, an objective and objective supporting means carried by said main housing portion, said main housing portion being substantially fully open at the bottom thereof and having upwardly and inwardly sloping front, rear and side walls for facilitating the moulding thereof, said side walls terminating in spaced relation to each other at their upper edges so as to form an access opening in the top of said main housing portion, a cover portion removably secured to said main housing portion and normally closing the major part of said access opening, a pair of transversely aligned vertically disposed openings in said side walls and communicating at their upper ends with said access opening when said cover portion is removed, a transversely arranged supporting member in said main housing portion and connected to said side walls adjacent the lower ends of said side wall openings, a transversely extending V-shaped groove formed in the upper surface of said supporting member for receiving and centering the lower edge of a lantern slide when positioned for projection in said projector, said side wall openings and said access opening together providing a clear space above said supporting member allowing said supporting member to be formed when the main housing portion is formed and integral therewith, yieldable inverted V-shape means centrally positioned in said main housing portion above said V-shaped groove for engaging and centering the upper edge of a slide when positioned for projection, and manually operable means carried by said main housing portion and arranged to engage a slide resting in said V-shaped groove and to move same into optical alignment with said objective.

2. A slide projector comprising a main housing portion, an objective and objective supporting means carried by said main housing portion, said main housing portion having side walls, a pair of transversely aligned vertically disposed openings in said side walls, transversely arranged supporting means in said main housing portion and connected to said side walls adjacent the lower ends of said side wall openings, a first groove and a second groove formed in the upper side of said supporting means in adjacent parallel relation, said first groove being V-shaped for receiving and centering the lower edge of a lantern slide when positioned for projection in said projector, a slidable member positioned in said second groove, guiding means within said main housing portion and adjacent the upper ends of said side wall openings, said guiding means having a channel portion for guiding said slidable member, yieldable inverted V-shaped means within said guiding means and centrally positioned relative to said main housing portion and above said V-shaped groove for engaging and centering the upper edge of a slide when positioned for projection, means carried by said slidable member and arranged to engage a slide resting in said V-shaped groove and to move same when said slidable member is moved inwardly into optical alignment with said objective, and a resilient member in transverse alignment with said yieldable V-shaped means and arranged to engage an upper edge portion of a slide in said V-shaped groove when said slide is moved partially out of said main housing portion and to retain said slide in such position while another slide is positioned in said main housing portion in alignment with said objective for projection purposes.

3. A slide projector comprising a main housing portion, an objective and objective supporting means carried by said main housing portion, said main housing portion having side walls, a pair of transversely aligned vertically disposed openings in said side walls, transversely arranged supporting means in said main housing portion and connected to said side walls adjacent the lower ends of said side wall openings, a transversely extending V-shaped groove formed in said supporting means for receiving and centering the lower edge of a lantern slide when positioned for projection in said projector, a second groove in said supporting means receiving and supporting the lower edge of a manually operable slidable member, yieldable inverted V-shaped means centrally positioned in said main housing portion above said V-shaped groove for engaging and centering the upper edge of a slide when positioned for projection, guide means adjacent said inverted V-shaped means for guiding the upper edge of said slidable member, means carried by said slidable member arranged to engage a slide resting in said V-shaped groove and to move same into optical alignment with said objective, and resilient means secured to said slidable member and having a free end portion in spaced relation therewith so as to form a slide receiving pocket, said slidable member and said resilient means functioning together to move said slide into projection position when they are moved into said main housing portion, the free end portion of said resilient means having a forward surface thereon positioned to engage the lantern slide in said main housing portion when pressed toward said slidable member and said slidable member is moved inwardly for ejecting the slide in said main housing portion outwardly thereof.

4. A slide projector comprising a main housing portion, an objective and objective supporting means carried by said main housing portion, said main housing portion having side walls, a pair of transversely aligned vertically disposed openings in said side walls, transversely arranged supporting means in said main housing portion and connected to said side walls adjacent the lower ends of said side wall openings, a first groove and a second groove formed in the upper side of said supporting means in adjacent parallel relation, said first groove being V-shaped for receiving and centering the lower edge of a lantern slide when positioned for projection in said projector, a slidable member positioned in said second groove, guiding means within said main housing portion and adjacent the upper ends of said side wall openings, said guiding means having a channel portion for guiding said slidable member, yieldable inverted V-shaped means within said guiding means and centrally positioned relative to said main housing portion and above said V-shaped groove for engaging and centering the upper edge of a slide when positioned for projection, means carried by said slidable member and arranged to engage said slide resting in said V-shaped groove and to move same when said slidable member is moved inwardly into optical alignment with said objective, a resilient retainer member in transverse alignment with said yieldable V-shaped means and arranged to engage an upper edge portion of a slide in said V-shaped groove when said slide is moved partially out of said main housing portion and to retain said slide in such position while another slide is positioned in said main housing portion in alignment with said objective for projection purposes, said means on said slidable member having a free end portion in spaced relation therewith so as to form a slide receiving pocket, said slidable member and said last mentioned means functioning together to move said slide into projection position when they are moved into said main housing portion, the free end portion of said last mentioned means having a forward surface thereon positioned to engage the lantern slide in said main housing when pressed toward said slidable member and said slidable member is moved inwardly for ejecting the slide in said main housing portion outwardly thereof.

5. A slide projector comprising a hollow one-piece main housing portion, an objective and objective supporting means carried by said main housing portion, said main housing portion being substantially fully open at the bottom thereof and having integrally formed inwardly sloping front, rear and side walls terminating in spaced relation to each other at their upper edges so as to form an access opening in the top of said main housing portion, a cover portion removably secured to said main housing portion and normally closing the major part of said access opening, a pair of transversely aligned vertically disposed openings in said side walls and communicating at their upper ends with said access opening when said cover portion is removed, transversely arranged supporting means in said main housing portion and integrally connected to said side walls adjacent the lower ends of said side wall openings, a transversely extending upwardly facing V-shaped groove formed in said supporting means for receiving and centering the lower edge of a lantern slide when positioned in alignment with said objective in said projector, one of said side walls adjacent the side wall opening therein sloping upwardly and inwardly to such an extent as to externally expose an upper edge portion of a slide when the lower edge portion thereof is initially loosely positioned upon said upwardly facing V-shaped groove for sliding movement into said projector, removable transversely extending yieldable inverted V-shaped means centrally positioned in said main housing portion above said V-shaped groove for engaging and centering the upper edge of said slide when positioned for projection, and manually operable means carried by said main housing portion and arranged to engage said slide loosely resting in its initial position in said V-shaped groove and to move same into optical alignment with said objective.

6. A slide projector comprising a hollow one-piece main housing portion, an objective and objective supporting means carried by said main housing portion, said main housing portion being substantially fully open at the bottom thereof and having integrally formed inwardly sloping front, rear and side walls terminating in spaced relation to each other at their upper edges so as to form an access opening in the top of said main housing portion, a cover portion removably secured to said main housing portion and normally closing the major part of said access opening, a pair of transversely aligned vertically disposed openings in said side walls and communicating at their upper ends with said access opening when said cover portion is removed, transversely arranged supporting means in said main housing portion and integrally connected to said side walls adjacent the lower ends of said side wall openings, a transversely extending upwardly facing V-shaped groove formed in the upper surface of said supporting means for receiving and centering the lower edge of a lantern slide when positioned in alignment with said objective for projection in said projector, a part of said groove adjacent one of said side walls being exposed so as to loosely receive and support a slide before it is moved into alignment with said objective, said side wall openings at their upper ends being shaped to provide spaced shelves, transversely extending removable support means within said main housing portion and having spaced parts thereof resting upon said shelves, transversely extending yieldable inverted V-shaped means centrally carried by said removable support means and positioned in said main housing portion above said V-shaped groove for engaging and centering the upper edge of a slide when positioned for projection, and manually operable means carried by said main housing portion and arranged to engage said slide loosely resting in said V-shaped groove and to move same into optical alignment with said objective, said cover portion when closing said access opening confining said removable support means against upward movement thereof.

7. A slide projector comprising a hollow one-piece main housing portion, an objective and objective supporting means carried by said main housing portion, said main housing portion being substantially fully open at the bottom thereof and having integrally formed inwardly sloping front, rear and side walls terminating in spaced relation to each other at their upper edges so as to form an access opening in the top of said main housing portion, a cover portion removably secured to said main housing portion and normally closing the major part of said access opening, a pair of transversely aligned vertically disposed openings in said side walls and communicating at their upper ends with said access opening when said cover portion is removed, transversely arranged supporting means in said main housing portion and formed integrally with said side walls adjacent the lower ends of said side wall openings, a first groove and a second groove formed in the upper side of said supporting means in adjacent parallel relation, said first groove being V-shaped for receiving and centering the lower edge of a lantern slide when positioned in alignment with said objective for projection in said projector, a slidable member positioned in said second groove, guiding means within said main housing portion and adjacent the upper ends of said side wall openings, said guiding means having a channel portion for guiding said slidable member, yieldable inverted V-shape means within said guiding means and centrally positioned relative to said main housing portion and above said V-shaped groove for engaging and centering the upper edge of a slide when positioned for projection, and projecting means carried by said slidable member and arranged to engage a slide resting in said V-shaped groove adjacent one of said side walls and to move same when said slidable member is moved inwardly into optical alignment with said objective.

8. A slide projector comprising a hollow one-piece main housing portion, an objective and objective supporting means carried by said main housing portion, said main housing portion being substantially fully open at the bottom thereof and having integrally formed inwardly sloping front, rear and side walls terminating in spaced relation to each other at their upper edges so as to form an access opening in the top of said main housing portion, a cover portion removably secured to said main housing portion and normally closing the major port of said access opening, a pair of transversely aligned vertically disposed openings in said side walls and communicating at their upper ends with said access opening when said cover portion is removed, transversely arranged supporting means in said main housing portion and integrally connected to said side walls adjacent the lower ends of said side wall openings, a transversely extending upwardly facing V-shaped groove formed in said supporting means for receiving and centering the lower edge of a lantern slide when positioned in alignment with said objective for projection in said projector, a second groove in said supporting means receiving and supporting a manually operable slidable member, said side wall openings at their upper ends being shaped to provide spaced shelves, transversely extending removable support means within said main housing portion and having spaced parts thereof resting upon said shelves, yieldable inverted V-shaped means carried by said removable support means and centrally positioned in said main housing portion above said V-shaped groove for engaging and centering the upper edge of a slide when positioned for projection, guide means carried by said removable support means adjacent said inverted V-shaped means for guiding the upper edge of said slidable member, means carried by said slidable member arranged to engage a slide resting in said V-shaped groove adjacent one of said side walls and to move same into optical alignment with said objective, and readily operable means carried by said slidable member and movable into an operating position for engaging an edge of a slide positioned in alignment with said objective and moving said slide outwardly of the projector as the slidable member is moved into said main housing portion.

9. A slide projector comprising a hollow one-piece molded main housing portion, an objective and objective supporting means carried by said main housing portion, said main housing portion being substantially fully open at the bottom thereof and having upwardly and inwardly sloping front, rear and side walls for facilitating the molding thereof, said side walls terminating in spaced relation to each other at their upper edges so as to form an access opening in the top of said main housing portion thereof, a cover portion removably secured to said main housing portion and normally closing the major part of said access opening, a pair of transversely aligned vertically disposed openings in said side walls and communicating at their upper ends with said access opening, a transversely arranged supporting member in said main housing portion and integrally connected to said side walls adjacent the lower ends of said side wall openings, a transversely extending V-shaped groove formed in the upper surface of said supporting member for receiving and centering the lower edge of a lantern slide when positioned in alignment with said objective for projection in said projector, a second groove in said supporting means receiving and supporting a manually operable slidable member, said side wall openings at their upper ends being shaped to provide spaced shelves, transversely extending removable support means within said main housing portion and having spaced parts thereof resting upon said shelves, yieldable inverted V-shape means carried by said removable support means and centrally positioned in said main housing portion and above said V-shaped groove for engaging and centering the upper edge of a slide when positioned for projection, guide means carried by said removable support means adjacent said inverted V-shaped means for guiding the upper edge of said slidable member, and means carried by said slidable member and arranged to engage a slide resting in said V-shaped groove and to move same into optical alignment with said objective, said cover portion when closing said access opening confining said removable support means against upward movement thereof.

References Cited in the file of this patent

UNITED STATES PATENTS

| | | |
|---|---|---|
| 952,199 | James | Mar. 15, 1910 |
| 2,231,743 | Young et al. | Feb. 11, 1941 |
| 2,298,369 | Greaves | Oct. 13, 1942 |
| 2,298,413 | Reid | Oct. 13, 1942 |
| 2,468,565 | Marcus et al. | Apr. 26, 1949 |
| 2,477,107 | Wolfe | July 26, 1949 |
| 2,522,760 | Lowber et al. | Sept. 19, 1950 |
| 2,590,492 | Bennett et al. | Mar. 25, 1952 |
| 2,614,458 | Critoph et al. | Oct. 31, 1952 |

FOREIGN PATENTS

| | | |
|---|---|---|
| 435,599 | France | Dec. 29, 1911 |